US006313812B1

(12) United States Patent
Nagano et al.

(10) Patent No.: US 6,313,812 B1
(45) **Date of Patent: *Nov. 6, 2001**

(54) SINGLE REMOTE CONTROL SYSTEM FOR PLURALITY OF AUDIO AND VISUAL EQUIPMENT

(75) Inventors: Shuichi Nagano, Chiba; Akira Katsuyama, Kanagawa; Hiroshi Koyama; Takashi Ishizuka, both of Tokyo; Keiichi Asakura, Kanagawa; Takahiro Hirai, Kanagawa; Masami Ishikawa, Kanagawa; Hiroshi Masuda, Tokyo; Takashi Koya, Kanagawa, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,961

(22) Filed: Oct. 7, 1997

(30) Foreign Application Priority Data

Oct. 14, 1996 (JP) ........................................ 08-291109

(51) Int. Cl.[7] .......................... G09G 5/00; H04N 5/268

(52) U.S. Cl. .......................... 345/2.1; 345/1.1; 348/705; 348/706

(58) Field of Search .......................... 345/1, 2, 197, 345/1.1, 2.1; 725/40–42, 37, 80; 348/552–553, 563–564, 705, 706

(56) References Cited

U.S. PATENT DOCUMENTS 5,416,535 * 5/1995 Sato et al. .......................... 348/706
5,475,835 * 12/1995 Hickey .......................... 348/13
5,510,828 * 4/1996 Lutterbach et al. .......................... 345/1
5,598,523 * 1/1997 Fujita .......................... 348/13
5,621,456 * 4/1997 Florin et al. .......................... 348/7
5,657,046 * 8/1997 Noble et al. .......................... 345/123
5,850,218 * 12/1998 LaJoie et al. .......................... 345/327
6,111,614 * 8/2000 Mugura et al. .......................... 345/339

FOREIGN PATENT DOCUMENTS 0482959 4/1992 (EP) .......................... H04L/12/40
0612157 8/1994 (EP) .......................... H04B/1/20

* cited by examiner

*Primary Examiner*—Matthew Luu
*Assistant Examiner*—Anthony J. Blackman
(74) *Attorney, Agent, or Firm*—Jay H. Maioli

(57) ABSTRACT

When input equipment is instructed by a remote control unit on the basis of a display of a monitor, a data signal is transmitted from a microcomputer of an AV amplifier to a microcomputer of a CD changer. When the signal is received by a microcomputer of the CD changer, display data is formed in the microcomputer of the CD changer on the basis of data in a memory and is outputted. In the AV amplifier, a switch is switched to the CD changer side. A cursor is formed by the microcomputer of the AV amplifer, the cursor and display data from the CD changer are synthesized by an image synthesizing circuit and displayed on the monitor. When an instruction is generated by the remote control unit on the basis of the display on the monitor, position coordinates of the cursor on the picture plane are generated from the microcomputer of the A/V amplifier to the microcomputer of the CD changer. On the basis of the display data and the position coordinates, the CD changer is controlled by its microcomputer. When a predetermined position on the picture plane is instructed by the remote control unit, the control is returned to the AV amplifier.

9 Claims, 7 Drawing Sheets

SINGLE REMOTE CONTROL SYSTEM FOR PLURALITY OF AUDIO AND VISUAL EQUIPMENT

BACKGROUND OF THE INVENTION

1. Field of the Invention

The invention relates to a control system for electronic equipment comprising, for example, a plurality of A/V (Audio/Visual) equipment connected so as to be controlled by one controller.

2. Description of the Related Art

Hitherto, A/V equipment which can perform an OSD (On Screen Display) output and has a GUI (Graphic User Interface) function existed. In such equipment, for example, a control state set by the user by using a remote controller is displayed to a monitor connected to the equipment. Thus, the user can confirm a setting state of a control of the equipment even from a position away from the equipment.

In the conventional A/V equipment, it is possible to connect a plurality of equipment having the GUI function, to select a video output and an audio output of each equipment, and to supply them to, for example, a monitor.

However, hitherto, a remote controller to control each of those equipment is an exclusive-use controller for each equipment. Therefore, the user needs to exchange and grasp the different remote controller for each equipment to be operated and to operate it. There is, consequently, a problem such that the GUI function provided to inherently improve an operability causes a deterioration in operability due to the operation such that the user exchanges and grasps the different remote controller.

Hitherto, an A/V equipment such that a number of connected A/V equipment are controlled in a lump, for example, what is called an A/V amplifier also existed. According to such an A/V amplifier, information of the other A/V equipment connected is previously stored in a memory provided in the amplifier and a function is selected for the amplifier by a remote controller or the like using infrared rays is selected, thereby controlling the equipment connected.

Consideration will now be made with respect to a case where an A/V equipment having a control corresponding to the A/V amplifier, for example, what is called a CD (Compact Disc) changer in which a number of CDs are enclosed and a specific CD is selected from a number of CDs and is reproduced is connected to the A/V amplifier. In the A/V amplifier, when the CD changer is selected as a function, a control corresponding to the CD changer is displayed on a monitor connected to the amplifier. The user operates the remote controller or the like on the basis of the display, so that he can control the CD changer.

When the connected equipment is a CD changer, a list of titles of the CDs enclosed in the CD changer can be displayed on the monitor by a predetermined operation. The titles which are displayed in this instance are stored into the memory of the A/V amplifier by transmitting information represented by characters reproduced, for example, in the CD changer to the A/V amplifier or transmitting information represented by characters by a direct input to the A/V amplifier by a remote control unit or the like by the user. However, in the A/V amplifier, since the equipment which is connected cannot be specified, a large capacity in the memory cannot be allocated to the specific equipment. Therefore, there is a problem such that the A/V amplifier itself cannot display a large amount of information.

On the other hand, even in the foregoing CD changer, the changer having the GUI function exists. In this case, in addition to the titles of the CDs enclosed in the CD changer, much information such as names of artists, titles of pieces of music recorded in the CDs, and the like can be displayed to the monitor. On the basis of this display, the user selects the CD by the remote controller and can select a desired piece of music with respect to the selected CD and can reproduce it. Various information represented by characters has previously been stored in the memory provided for the CD changer. In the example of the CD changer, different from the foregoing A/V amplifier, since information such as functions of the set, the number of discs, and the like is obvious, an optimum memory construction can be used. In this case, however, the user has to operate the remote controllers of both of the A/V amplifier and the CD changer.

OBJECTS AND SUMMARY OF THE INVENTION

It is, therefore, an object of the invention to provide a concentrated control system of electronic equipment which can perform a concentrated remote control in a system to which A/V equipment having the GUI function is connected.

According to the invention, to solve the foregoing problem, there is provided a control system for electronic equipment for concentratedly controlling a plurality of electronic equipment, comprising: at least one or more electronic equipment which are connected by a predetermined method and can be controlled by a predetermined control signal; a controller for transferring the control signal to at least one of the electronic equipment; transfer means for transferring a data signal to each of the electronic equipment; discriminating means for discriminating contents of the data signal transferred by the transfer means; and selecting means for selecting the electronic equipment on the basis of a discrimination result in the discriminating means and displaying display data from the selected electronic equipment, wherein a control is shifted to the selected electronic equipment.

According to the invention, to solve the foregoing problem, there is provided a controller which is used in a system for concentratedly controlling a plurality of electronic equipment which comprises at least one or more electronic equipment which are connected by a predetermined method and can be controlled by a predetermined control signal, transfer means for transferring a data signal to each of the electronic equipment, discriminating means for discriminating contents of the data signal transferred by the transfer means, and selecting means for selecting the electronic equipment on the basis of a discrimination result in the discriminating means and displaying display data from the selected electronic equipment, and in which a control is shifted to the selected electronic equipment on the basis of the control signal, characterized in that the control signal is transferred to at least one of the electronic equipment for the system.

According to the invention, to solve the foregoing problem, there is provided electronic equipment which can be controlled by a predetermined control signal and in which a plurality of electronic equipment can be connected, characterized by comprising: transfer means for transferring a data signal to the other electronic equipment connected; receiving means for receiving a data signal from the other electronic equipment connected; discriminating means for discriminating contents of the data signal received by the receiving means; and selecting means for selecting the other electronic equipment on the basis of a discrimination result in the discriminating means and displaying display data from the selected other electronic equipment, wherein a control is shifted to the other electronic equipment on the basis of a predetermined control signal.

As mentioned above, according to the invention, among the connected electronic equipment, the control is shifted to the electronic equipment selected on the basis of an instruction of the controller and the display data from the selected electronic equipment is displayed, so that the electronic equipment can be concentratedly controlled.

The above, and other objects, features and advantages of the present invention will become readily apparent from the following detailed description thereof which is to be read in connection with the accompanying drawings.

DETAILED DESCRIPTION OF THE PREFERRED EMBODIMENTS

Figure 1:
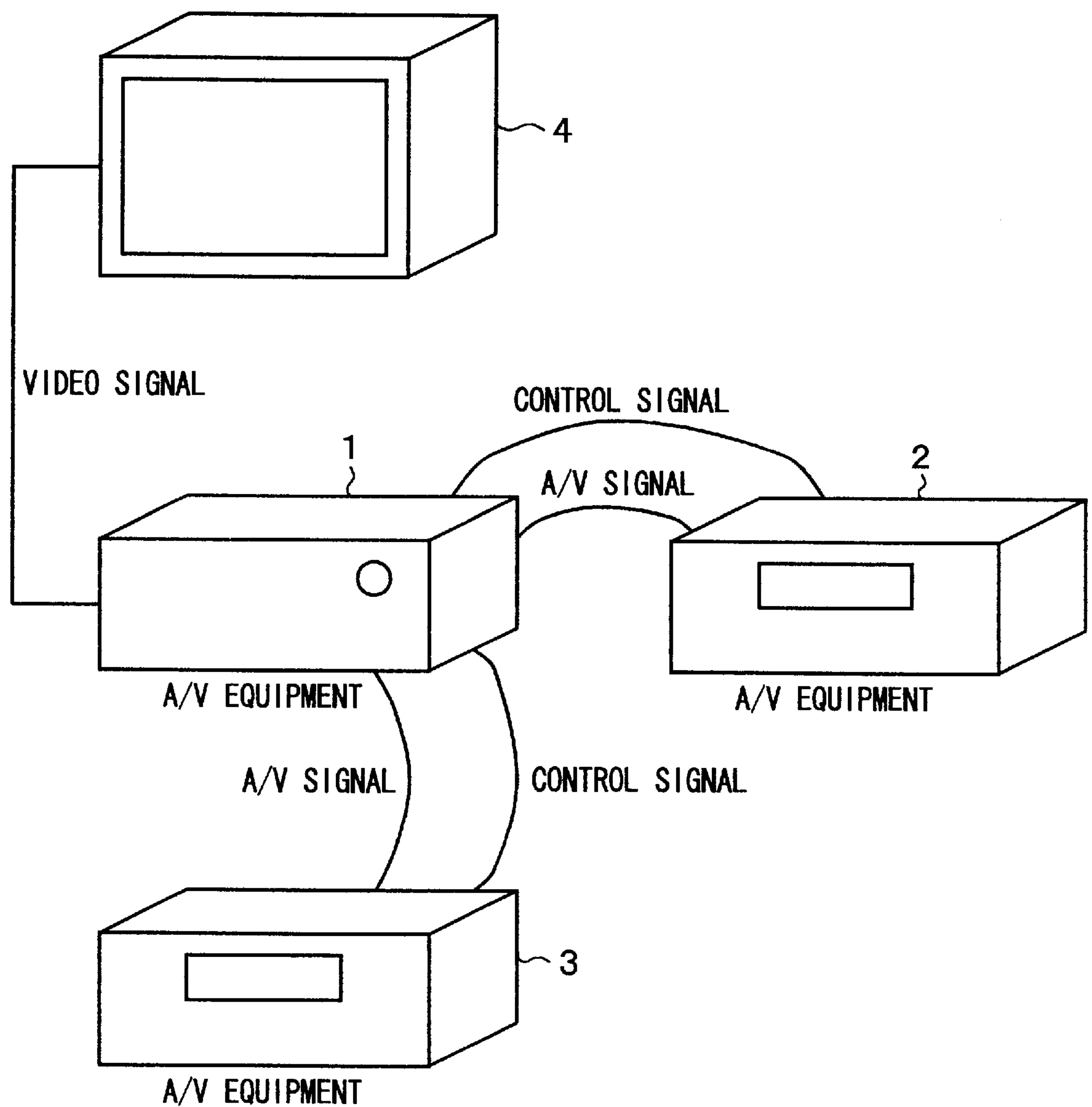
FIG. 1 is a schematic diagram showing an example of an A/V system to which the invention is applied.

An embodiment of the invention will now be described hereinbelow with reference to the drawings. FIG. 1 shows an example of an A/V system to which the invention is applied. A control of the A/V equipment according to the invention will be schematically explained. In the invention, as shown in FIG. 1, a path of a video signal and an audio signal (hereinafter, referred to as an A/V signal line) and a path a control signal for controlling each of connected A/V equipment (hereinafter, referred to as a control signal line) are separately provided and those paths are connected by different connecting lines, respectively. An instruction code comprising various information and a control signal is included in the control signal line, thereby enabling an interlocking operation to be performed among the connected A/V equipment.

In the example shown in FIG. 1, an amplifier 1, a CD player 2, and a cassette deck 3 are connected by control signal lines and A/V signal lines, respectively. A video output of the amplifier 1 and a monitor 4 for displaying a video signal are connected by a connecting line.

In this case, for example, when a play button of the CD player 2 is depressed and the CD player is set into a play mode, a signal indicative of the play mode is outputted so as to transfer a control signal to the control signal line. In the amplifier 1, a function button as a switch to select a function of the amplifier 1 is automatically switched so as to select the A/V signal input path from the CD player 2 on the basis of the control signal. Thus, the user can listen to an audio signal reproduced by the CD player 2. When an image signal indicative of, for instance, a setting mode of the CD player 2 is outputted from the CD player 2, the image signal is supplied to the monitor 4 through the amplifier 1 and an image is displayed by the monitor 4 on the basis of the image signal.

For example, when a play button of the cassette deck 3 is depressed, a signal indicating that the cassette deck 3 is in the play mode is outputted as a control signal from the cassette deck 3. On the basis of this signal, in the amplifier 1, the A/V signal input path is automatically switched from the path from the CD player 2 to the path from the cassette deck 3. As a result, the user can listen to an audio signal reproduced by the cassette deck 3.

When an image signal indicative of a setting mode or the like of an equipment is outputted from the cassette deck 3, the image signal is supplied to the monitor 4 through the amplifier 1 and an image based on the image signal is displayed on the monitor 4.

In the above example, the equipment which was set into the play mode notifies the other equipment of the setting mode, thereby allowing various switches corresponding to the notified equipment to be automatically switched. Since such a notification is not a command which is sent to the connected equipment from the side where information composed of the control signal is transmitted, in the equipment which received the information, the received information is selected or omitted and the optimum state is derived.

A control opposite to the above control is also possible. That is, in the amplifier 1, an instruction code for the other A/V equipment connected is transmitted as a control signal, thereby enabling the other A/V equipment connected to be controlled. In the connection example of FIG. 1, the function button of the amplifier 1 is set so as to select, for instance, the A/V signal input path from the CD player 2. Thus, a control signal so as to set the CD player 2 into the play mode is automatically outputted from the amplifier 1. A CD is automatically played by the CD player 2 which received the control signal. Since the control signal is also supplied to the cassette deck 3 together with the CD player 2, if the cassette deck 3 is in the play mode in this instance, a control so as to stop it can be also performed. According to the invention as mentioned above, a plurality of A/V equipment can be simultaneously controlled by one operation.

Figure 2A:
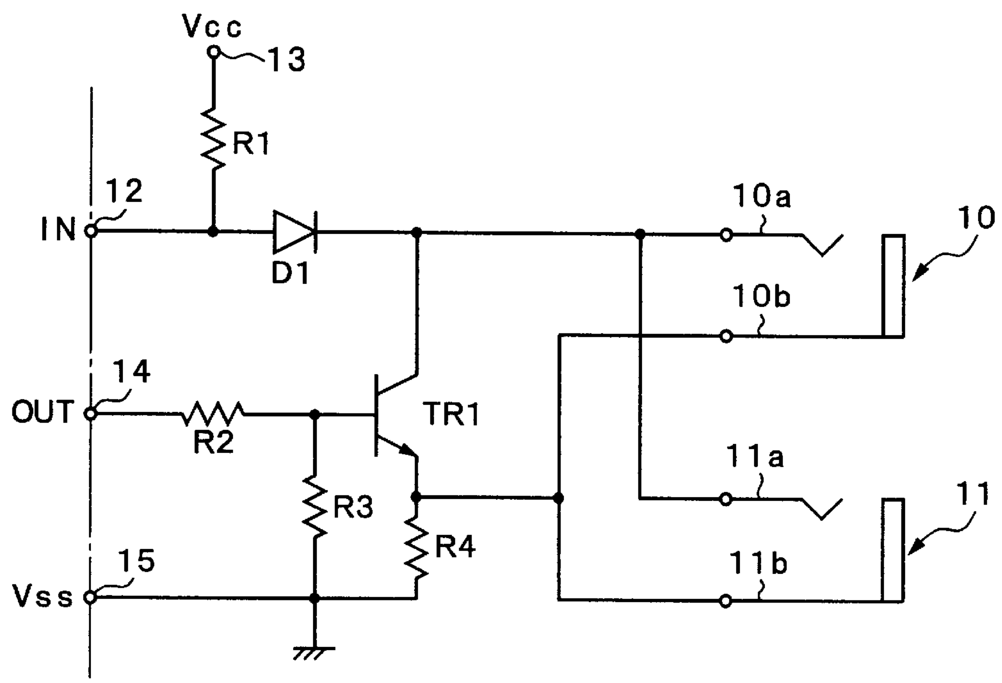
FIGS. 2A and 2B are circuit diagrams showing an example of a circuit construction of a control signal input/output section.

FIG. 2A shows an example of a circuit construction of a control signal input/output section which enables the control signal for a plurality of equipment to be transmitted as mentioned above. An input signal from an output port (not shown) of a microcomputer of the A/V equipment is supplied to a terminal 14. The terminal 14 is connected to a base of a transistor TR1 through a resistor R2. A resistor R3 is connected between the base of the transistor TR1 and a grounding terminal 15. An emitter of the transistor TR1 is connected to the grounding terminal 15 through a resistor R4 and is also connected to contact terminals 10*b* and 11*b* of terminals 10 and 11, respectively. An input is supplied to an input port (not shown) of the microcomputer through a terminal 12. A resistor R1 is connected between the terminal 12 and a power source terminal 13. The terminal 12 is connected to an anode of a diode D1. A cathode of the diode D1 is connected to a collector of the transistor TR1 and is also connected to the contact terminals 10*a* and 11*a* of the terminals 10 and 11, respectively.

Figure 2B:
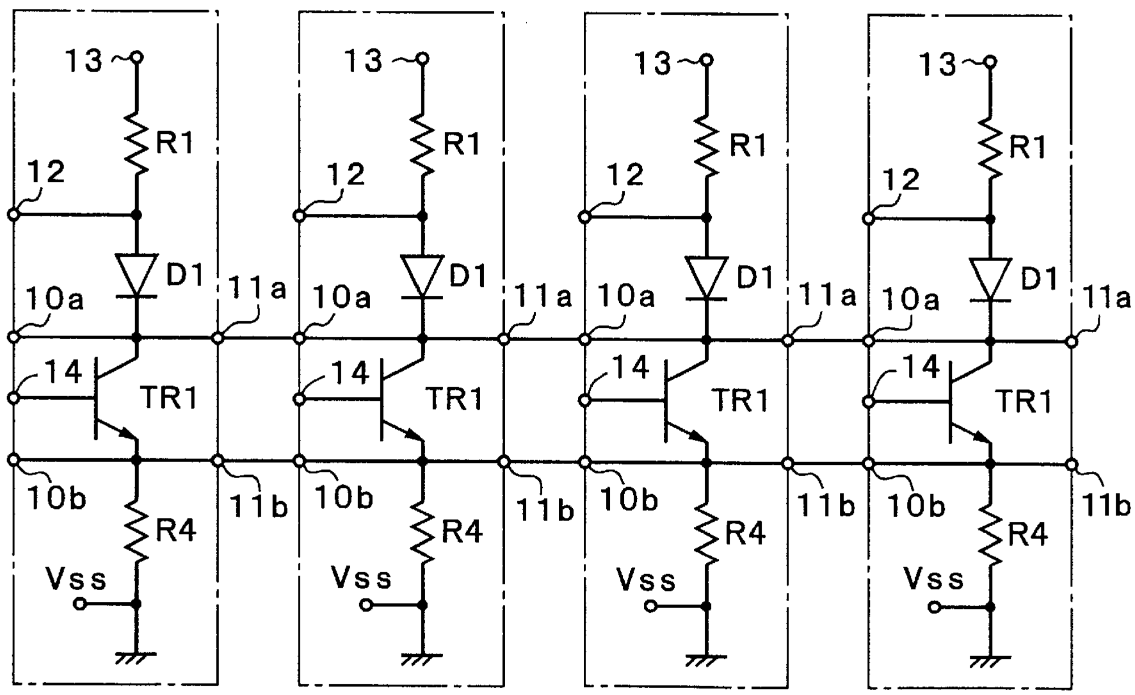

The control signal input section is provided for each A/V equipment and the terminals 10 and 11 of each A/V equipment are mutually connected. As shown in FIG. 2B, when a plurality of such circuits are connected by the terminals 10 and 11, they can be considered as an OR circuit in which the transistor TR1 of each circuit is used as a switch. In this case, a signal at the "L" level is supplied as an initial state to the terminal 14 of each circuit. At this time, a signal at the "H" level is outputted to the terminal 11 of each circuit. In any one of the circuits, by supplying the signal at the "H" level to the terminal 11, the level at the terminal 11 of each circuit can be set to the "L" level.

Figure 3:
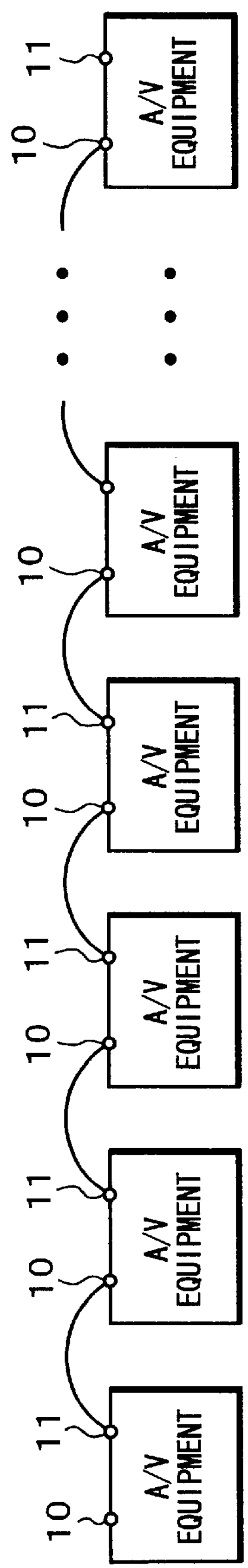
FIG. 3 is a schematic diagram for explaining a connection of a plurality of A/V equipment according to the invention.

Since such a circuit is used, a plurality of A/V equipment can be serially connected. That is, as shown in FIG. 3, by mutually connecting the output terminals 11*a*, 11*b* provided for each equipment to the input terminals 10*a*, 10*b* of the other equipment, a construction shown in FIG. 2B mentioned above is realized. The control signal can be transmitted from any one of the connected equipment and any equipment can receive the transmitted signal. According to this construction, the number of equipment which are connected by a serial chain is not limited.

Actually, the number of equipment which can be connected is limited by a factor such as a capacity of a transmission line which is used for connection or the like.

Figure 4:
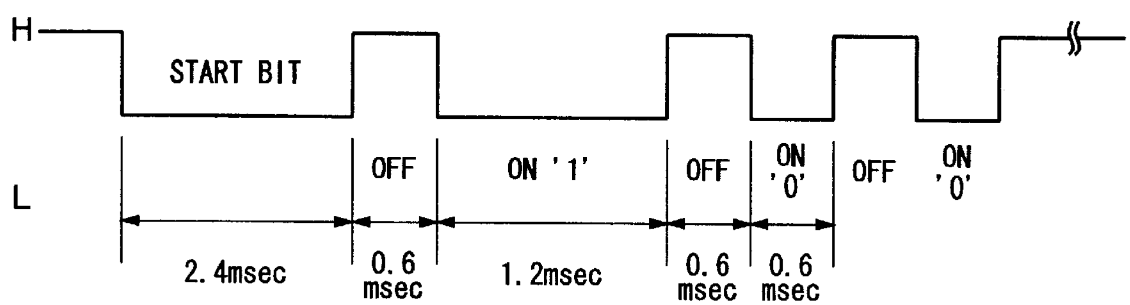
FIG. 4 is a schematic diagram showing an example of a transfer method of data signals among the A/V equipment according to an embodiment of the invention.

FIG. 4 shows an example of a transferring method of a data signal among the A/V equipment according to the embodiment. As mentioned above, since the control signal input/output section according to the embodiment is constructed so as to form an OR circuit as a whole, the signal at the "L" level is outputted as data for the signal at the "H" level which is set to be default. In this example, the data is classified depending on a length of an interval of the "L" level. In this data that is transferred as serial data, a start bit indicates the start of data transmission. Bit data is expressed by an on bit. The on bit of a long interval indicates "1" and the on bit of a short interval indicates "0". The bit data is separated by an off bit at the "H" level. An example of a length of interval of each bit is shown below.

Start bit=2.4 msec

Off bit=0.6 msec

On bit ("0")=0.6 msec

On bit ("1")=1.2 msec

The above values are not limited to such an example but a length of interval corresponding to each data can be also set to another length. It is preferable to set the length in correspondence to a communicating speed.

Figure 5:
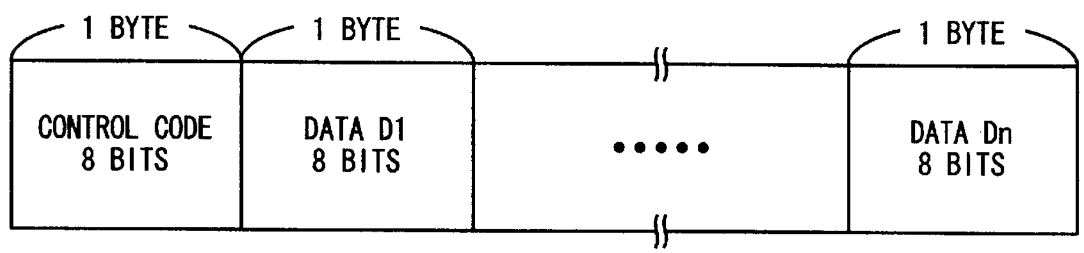
FIG. 5 is a schematic diagram showing an example of a construction of data that is transferred in the embodiment.

The data is constructed by setting eight bits, namely, one byte to a minimum unit and is then transferred. FIG. 5 shows an example of a data construction. First one byte indicates a control code. The control code shows a name of connected A/V equipment and also indicates a distinction about whether the data is instruction data to the equipment or mode data from the equipment. For instance, in the foregoing example of FIG. 1, when the data signal to be transferred is an instruction to the CD player 2, the control code is set to "90". When it is the data that is transmitted from the CD player 2 and indicates the mode of the CD player 2, the control code is set to "98".

Although a data size of the above data is not particularly limited, actually, it is preferable to set it to about 16 bytes in consideration of a point such as a transfer speed or the like.

In the above construction, when the signals are transmitted at the same timing from a plurality of equipment, there is a possibility such that a conflict of the signals occurs and erroneous data is transmitted or received. For example, when the off bit and the on bit are transmitted at the same timing from different equipment, the off bit at the "H" level is used as an on bit at the "L" level. In the circuit, the signal supplied at the terminal 14 is inverted at the terminal 12 and is detected. By using such a nature and by monitoring its own data signal in each equipment, the conflict can be detected. When the conflict is detected, for example, the data signal is again transmitted after a predetermined time interval.

Figure 6:
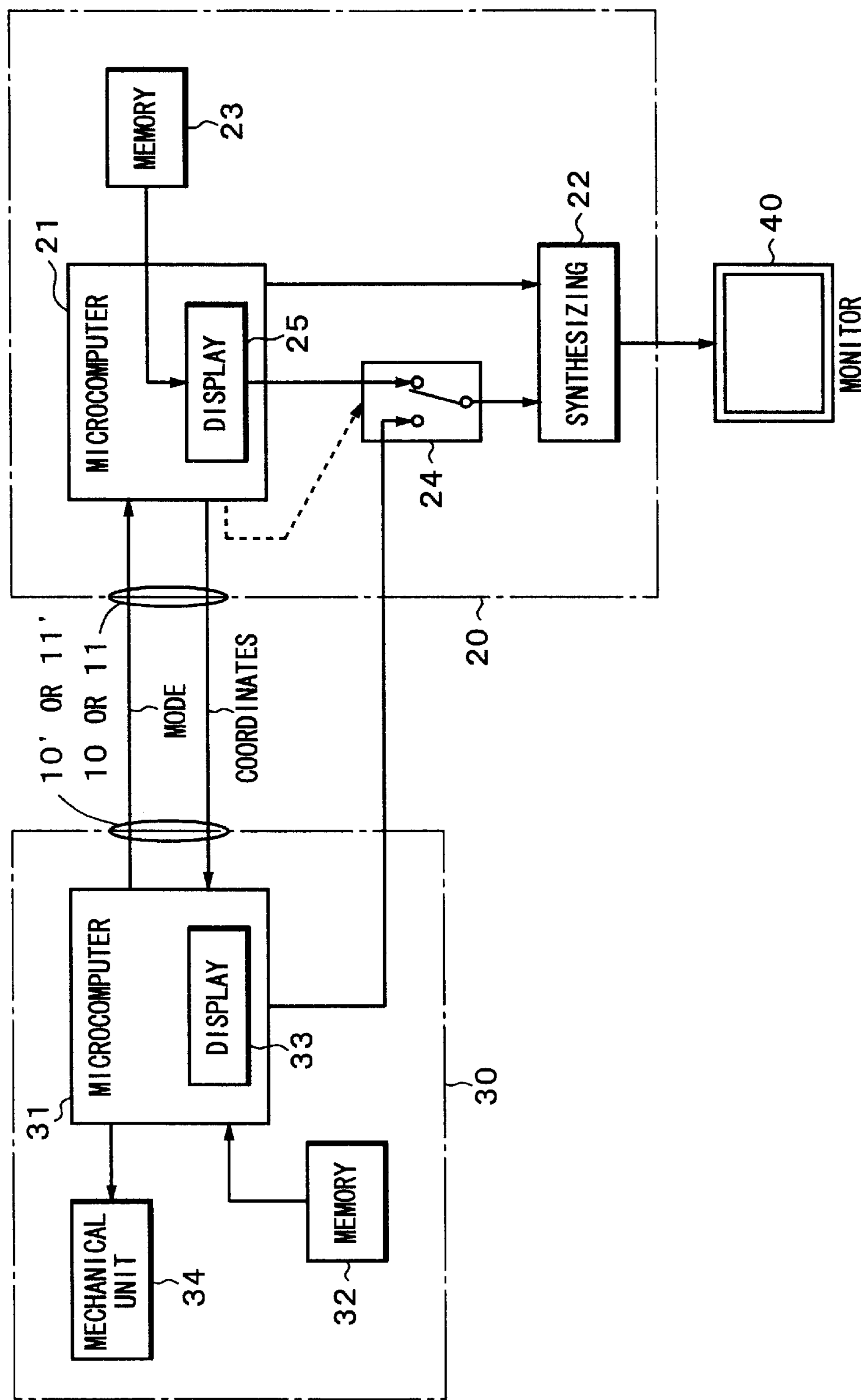
FIG. 6 is a block diagram showing an example of a construction of the A/V system according to the embodiment.

FIG. 6 shows an example of a construction of an A/V system according to the embodiment and this is an example in which an A/V amplifier 20 and a CD changer 30 are connected through the terminals 10 or 11. A monitor 40 to display a video image is connected to the A/V amplifier 20. A plurality of (for example, 200) CDs can be enclosed in the CD changer 30. For explanation, two going and returning systems are shown as signal paths between terminals 10 or 11 in the diagram. To avoid complexity, portions such as an audio signal system and the like which are not directly concerned with the present invention are omitted.

In the A/V amplifier 20, a microcomputer 21 is made up of, for instance, a microprocessor and a necessary memory such as RAM or ROM. The microcomputer 21 has a display unit 25 for converting character data or predetermined control data into an image signal that can be displayed by the monitor 40. Further, although not shown, the foregoing control signal input/output section shown in FIG. 2A exists between the microcomputer 21 and the terminals 10 and 11. The control signal supplied from the terminal 10 or 11 is supplied to the microcomputer 21 through the control signal input/output section.

A cursor signal is formed in the microcomputer 21. The cursor signal assists the user when he designates coordinates on a screen of the monitor 40. For example, a shape of hand or an arrow which is pointed out is displayed on the monitor 40. The cursor signal is supplied to one input terminal of an image synthesizing circuit 22.

In the microcomputer 21, image data based on data stored in a memory 23 is formed. The image data is converted into an image signal by the display unit 25. The image signal is supplied to one input terminal of a switching circuit 24 whose selection is controlled by a control signal that is outputted from the microcomputer 21. An output of the switching circuit 24 is supplied to the other input terminal of the image synthesizing circuit 22. The image signals supplied to one and the other input terminals are synthesized by the image synthesizing circuit 22. The synthetic image signal is supplied to the monitor 40 and is displayed.

The image synthesis which is performed in the image synthesizing circuit 22 is executed so that two picture planes will not influence each display using an existing technique. For this purpose, in the synthetic image that is obtained by the image synthesizing circuit 22, the cursor can freely move in the picture plane.

The A/V amplifier 20 can be remote controlled. Although not shown, such a remote control is realized by a method whereby, for example, the amplifier 20 has a photosensing unit of an infrared signal and an infrared signal is transmitted to the photosensing unit by a remote control commander (hereinafter, abbreviated to a "remocon") which can modulate a control command for the amplifier 20 and can transmit a modulated signal as an infrared signal. When the infrared signal is received by the A/V amplifier 20, the signal is analyzed by the microcomputer 21 of the A/V amplifier 20. The amplifier 20 is controlled on the basis of an analysis result.

A direction sensing device by, for example, a gyro mechanism or the like is built in the remocon. Movement data is formed on the basis of direction data detected by the direction sensing device. In this case, when a valid range of the screen of the monitor 40 exists in the direction where the remocon directs, actual coordinates of the screen of the monitor 40 are set to coordinate information. The movement data is formed on the basis of the coordinate information. The cursor is moved on the screen of the monitor 40 on the basis of the movement data. When a predetermined operation is performed for the remocon by the user, the function shown at the position on the screen of the monitor 40 where the cursor exists is designated and the designated function is realized.

The signal which is transmitted from the remocon is not limited to the foregoing infrared signal. For example, a frequency modulated radio wave can be used as such a signal. In case of using a radio wave, the signal can be detected in a range wider than that in case of using the infrared signal.

The formation of the movement data based on the instruction of the remocon is not limited to the foregoing method using the direction sensing device built in the remocon. For example, it is also possible to provide direction keys corresponding to the upper, lower, left, and right directions for the remocon and to form the movement data on the basis of the operation by the direction keys. The formation of the movement data can be also performed on the basis of the operation of what is called a 4-directions-key, joystick, or the like.

In the CD changer 30, the foregoing control signal input/output section shown in FIG. 2A exists between a microcomputer 31 comprising a microprocessor, an RAM, an ROM, and the like and terminals 10' and 11'. The control signal supplied from the terminal 10 or 11 is supplied to the microcomputer 31 through the control signal input/output section.

In a manner similar to the foregoing microcomputer 21, the microcomputer 31 has a display unit 33 for converting character data or predetermined control data into an image signal which can be displayed by the monitor 40. Image data based on the data stored in a memory 32 is formed in the microcomputer 31. The image data is converted into an image signal by the display unit 33 and is supplied as a video output to the A/V amplifier 20. In the amplifier 20, the image signal is supplied to the other input terminal of the switching circuit 24.

In the CD changer 30, a mechanical unit 34 to actually exchange or drive the CD is controlled by a control signal from the microcomputer 31.

An example of the operation of the A/V amplifier 20 will now be described with the above construction. It is now assumed that in the function of the A/V amplifier 20, the path to which the CD changer 30 is connected is selected. As mentioned above, a video output from the CD changer 30 is supplied to the amplifier 20 and is selected as an input function.

In such a connecting state, a power supply of the CD changer 30 is turned on preliminarily or simultaneously with a power supply of the A/V amplifier 20. The above power-on operation is realized, for example, by providing power supplying means which is interlocked with the A/V amplifier 20 for the A/V amplifier 20 and by supplying a power source of the CD changer 30 from the power supplying means. When the power source of each of the connected A/V equipment is turned on, a data signal including information (model data) indicative of each equipment is transmitted from the terminal 10 or 11 of each equipment. When the model data signal of each of the connected equipment is received by the A/V amplifier 20, the equipment connected to the amplifier 20 is discriminated.

For example, the model data signal indicative of the CD changer 30 is generated from the CD changer 30. When the model data signal is received by the A/V amplifier 30, a fact that the CD changer 30 is connected to the A/V amplifier 20 is discriminated. Now, information indicating that, for instance, the CD changer 30 has the video output is allowed to be included in the model data signal, thereby enabling the A/V amplifier 20 to recognize such a fact.

Figure 7:
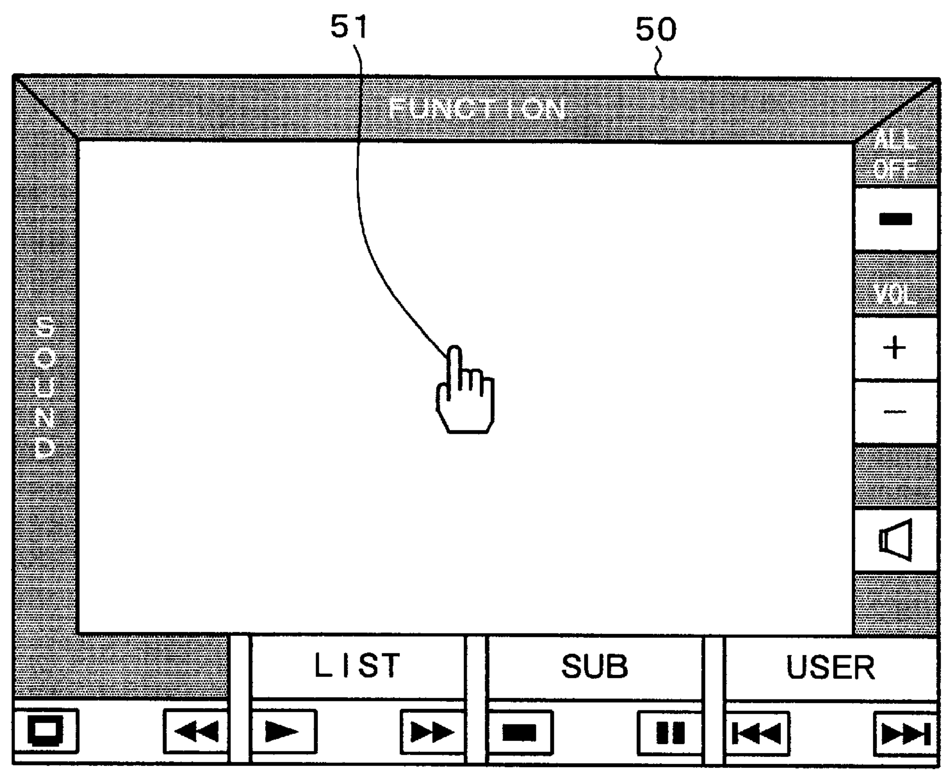
FIG. 7 is a schematic diagram showing an example of the first display picture plane on a monitor.

FIG. 7 shows an example of the first display picture plane on the monitor 40. At this time point, in the switching circuit 24 of the A/V amplifier 20 shown in FIG. 6, one input terminal as a microcomputer 21 side is selected. The display picture plane is formed by the microcomputer 21 on the basis of the information stored in the memory 23. The image supplied to the image synthesizing circuit 22 through the switching circuit 24 and the cursor formed by the microcomputer 21 are synthesized in the image synthesizing circuit 22. The synthetic image signal is supplied to the monitor 40, so that an image is displayed.

As shown in FIG. 7, various control displays are arranged on a picture plane 50. A display arranged at the right edge of the picture plane 50 is a sound volume control display. A control display is arranged to two stages at the lower edge of the picture plane 50. The display at the lower edge is a control display that is peculiar to the equipment selected by the function in the A/V amplifier 20. In the example in which the CD changer 30 is selected, a control display regarding the selection of the CD is performed at the upper stage, and a control display regarding the reproduction of the selected CD is performed at the lower stage, respectively.

A control display to display a menu for switching the function of the amplifier 20 is arranged at the upper edge of the picture plane 50 and a control display to display a menu for audio control is arranged at the left edge, respectively. An image which is supplied from the equipment designated by the function can be displayed in the center portion of the picture plane 50. The display in the center portion will be described hereinlater.

As shown in FIG. 7, a cursor 51 is displayed at an arbitrary position on the picture plane. The cursor 51 is moved on the basis of the movement data which is obtained by the foregoing method and is overlaid to a desired control display of the picture plane 50. By performing a predetermined operation for the remocon, on example, by depressing an "ENTER" key provided for the remocon, a control shown in the control display on which the cursor 51 is overlaid is selected.

Figure 8:
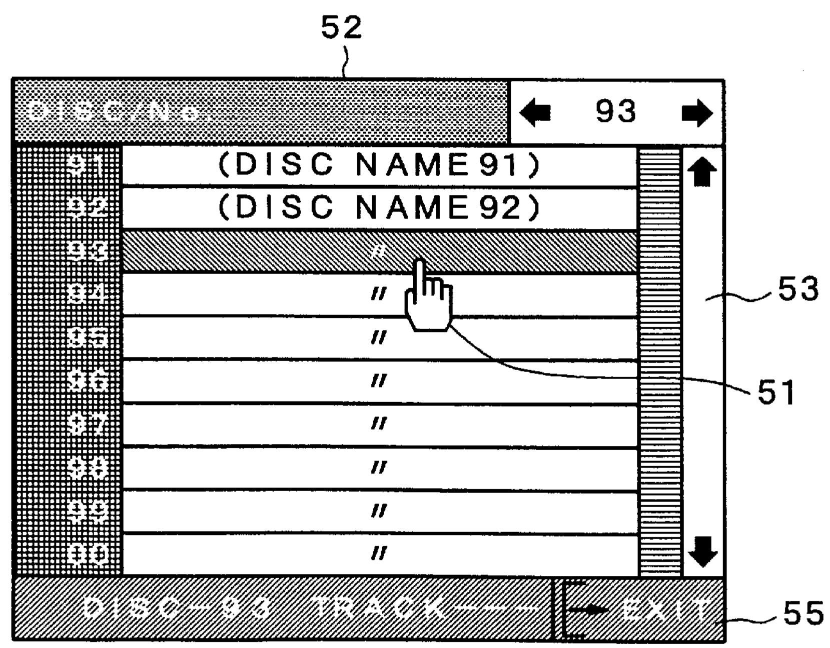
FIG. 8 is a schematic diagram showing an example of a display picture plane on the monitor.
Figure 9:
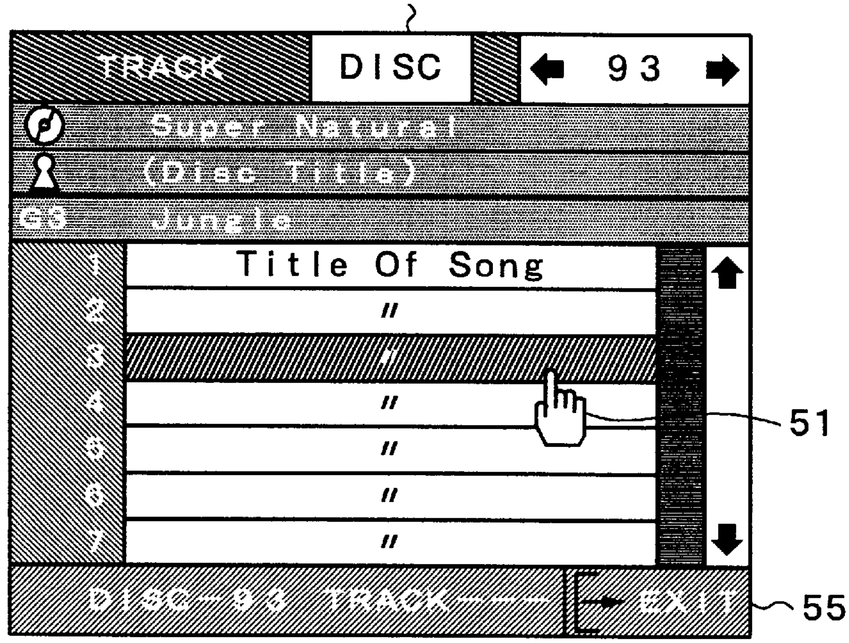
FIG. 9 is a schematic diagram showing an example of a display picture plane on the monitor.

On the picture plane 50, when "LIST" shown at the lower stage is designated, the operating mode is switched and the display of the picture plane 50 is set to contents shown in FIGS. 8 or 9. The displays of FIGS. 8 and 9 are based on the image signal which is supplied from the CD changer 30. That is, when "LIST" is selected, the control signal including a mode switching code is transmitted from the A/V amplifier 20 to the CD changer 30 by the control of the microcomputer 21. In the CD changer 30, an image signal is formed by the microcomputer 31 on the basis of the mode switching code and is outputted.

On the other hand, on the A/V amplifier 20 side, an input terminal of the switching circuit 24 is switched from one input terminal to the other input terminal as a CD changer 30 side by the control of the microcomputer 21. Thus, the image signal outputted from the microcomputer 31 is supplied to the image synthesizing circuit 22 through the switching circuit 24. In the image synthesizing circuit 22, the image signal and the cursor signal supplied from the microcomputer 21 are synthesized and displayed on the monitor 40.

In FIGS. 8 and 9, for example, in FIG. 8, a list of the titles of the CDs enclosed in the CD changer 30 is displayed (picture plane 52). In FIG. 9, a list of music pieces recorded in the selected CD is displayed (picture plane 54). In FIG. 8, when a predetermined CD title is selected, the operating mode is further switched and the display of the picture plane 52 is shifted to a display of a picture plane 54 of FIG. 9.

As mentioned above, when the display is performed on the basis of the image signal supplied from the CD changer 30, the control signal which is supplied from the A/V amplifier 20 to the CD changer 30 is made up of coordinate data of the cursor 51 at a position where the "ENTER" key was depressed. The coordinate data is supplied as a control signal to the microcomputer 31 of the CD changer 30 from the microcomputer 21 through the terminal 10 or 11 and terminal 10' or 11'.

By supplying the coordinate data from the A/V amplifier 20 to the CD changer 30, the picture plane control is shifted from the A/V amplifier 20 to the CD changer 30. That is, in the microcomputer 31, the image data (image data to display the foregoing picture plane 52 or 54) supplied to the A/V amplifier 20 and the supplied coordinate data are made to correspond and the control based on the control display displayed on the picture plane 52 or 54 is performed.

That is, by the operation of the remocon by the user, for example, the cursor 51 is matched with the control display displayed on the picture plane 52 and, for instance, the "ENTER" button is depressed. An infrared signal including data indicative of the position of the cursor is transmitted from the remocon to the infrared photosensing unit of the A/V amplifier 20. This signal is analyzed by the microcomputer 21. On the basis of the obtained coordinate data of the cursor 51, a cursor image signal is formed in the microcomputer 21. The cursor image signal and the image signal supplied from the CD changer 30 are synthesized by the image synthesizing circuit 22 and the picture plane 52 is formed and displayed on the monitor 40. The coordinate data of the cursor 51 is also supplied to the microcomputer 31 of the CD changer 30.

In the microcomputer 31, the contents of the control are discriminated on the basis of the supplied coordinate data and the image data for the picture plane 52. The image data is formed on the basis of the contents of the control. For example, the title data of the CDs which has previously been stored in the memory 32 is read out and the image data is formed by the microcomputer 31 on the basis of the title data which was read out. The image data is converted into an image signal by the display unit 33 and is supplied as video output to the A/V amplifier 20. As mentioned above, the control of the CD changer 30 by the remocon of the A/V amplifier 20 is performed.

For example, a list of the titles of the CDs enclosed in the CD changer 30 is displayed on the picture plane 52 shown in FIG. 8. The user can select a desired CD from the displayed title list by the operation of the remocon. For example, although 200 CDs can be enclosed in the CD changer 30, for instance, ten titles can be displayed in a lump on the picture plane 52. On the picture plane 52, the other titles can be sequentially displayed by operating a scroll bar 53 provided at the right edge of the picture plane 52 by using the remocon. The above display can be performed by a method whereby the title data of the CDs is sequentially read out from the memory 32 in the CD changer 30 in association with the operation of the scroll bar 53 by the remocon.

The selection of the CD based on the picture plane 52 is also similarly performed. For example, on the picture plane 52, a CD title display line where the cursor exists is emphasized by an inversion display or the like. By depressing the "ENTER" button of the remocon in the line on which a desired CD title is displayed, the CD is selected. The music title data of the CDs enclosed in the CD changer 30 can be preliminarily stored in the memory 32. When the CD is selected, the music title data of the selected CD is read out from the memory 32. On the basis of the music title data which was read out, image data for displaying the picture plane 54 is produced in the microcomputer 31 and is converted into the image signal by the display unit 33. The image signal is supplied as a video output to the A/V amplifier 20. By selecting a desired one of the music titles displayed on the picture plane 54, the CD can be reproduced.

An "EXIT" button 55 is provided for the picture planes 52 and 54 which are displayed on the basis of the video output supplied from the CD changer 30. By designating the button 55, the screen can be returned to the previous picture plane. For example, when the "EXIT" button 55 is designated on the picture plane 54, the picture plane 52 is displayed. When the button 55 is designated on the picture plane 52, the control is shifted from the CD changer 30 to the A/V amplifier 20. Such a shift is performed by generating a predetermined control signal from the microcomputer 31 to the microcomputer 21. On the basis of the control signal, the switching circuit 24 is switched and the picture plane 50 formed by the microcomputer 31 is displayed on the monitor 40.

According to this embodiment, two kinds of instruction codes to instruct different controls exist in the control signal which is generated from the A/V amplifier 20 to the CD changer 30. In the instruction codes, for example, the first code is set to "903A" and the second code is set to "9039".

Among them, the first code is used in, for example, a case where the cursor can be freely moved on each picture plane as mentioned above. In this case, since the cursor can freely move in the picture plane, for example, only when the "ENTER" key is depressed in the remocon, the coordinate data of the cursor at that time is transmitted from the A/V amplifier 20 to the CD changer 30. A predetermined control is performed to the CD changer 30 in response to the coordinate data. The cursor display is formed on the A/V amplifier 20 side.

Since there is a limitation in the transfer speed of the control signal, if the movement data is transmitted from the A/V amplifier 20 to the CD changer 30 in a real-time manner, a time lag occurs between the cursor display in the picture plane and the operation of the remocon. Therefore, it is necessary to avoid a deterioration in operability. Thus, if the transfer speed of the control signal is sufficiently high, the control of the cursor display can be also performed on the CD changer 30 side.

On the other hand, the second code is used in the case where, for example, the cursor is moved in each picture plane for every control display. This state corresponds to a case where the remocon of the A/V amplifier 20 has the upper, lower, left, and right direction keys or a cross-key as mentioned above. In this case, after the switching circuit 24 was switched to the CD changer 30 side, each time the direction key of the remocon of the A/V amplifier 20 is depressed, an instruction code so as to perform the cursor movement corresponding to the depressed key is transmitted as cursor movement data from the A/V amplifier 20 to the CD changer 30. The display of the cursor movement due to the movement data is executed on the CD changer 30 side.

When the cursor is moved for the target control display, in the remocon of the A/V amplifier 20, for example, by depressing the "ENTER" key, the selection is performed. In the CD changer 30, the control corresponding to the "ENTER" key is executed.

Even in any of the foregoing first and second instruction codes, for example, by selecting the "EXIT" button 55 in the picture plane 52, the operating mode is switched and the picture plane control can be returned from the CD changer 30 to the A/V amplifier 20. The instruction code is transmitted from the CD changer 30 to the A/V amplifier 20. In the A/V amplifier 20, the switching circuit 24 is switched in accordance with the instruction code.

Figure 10:
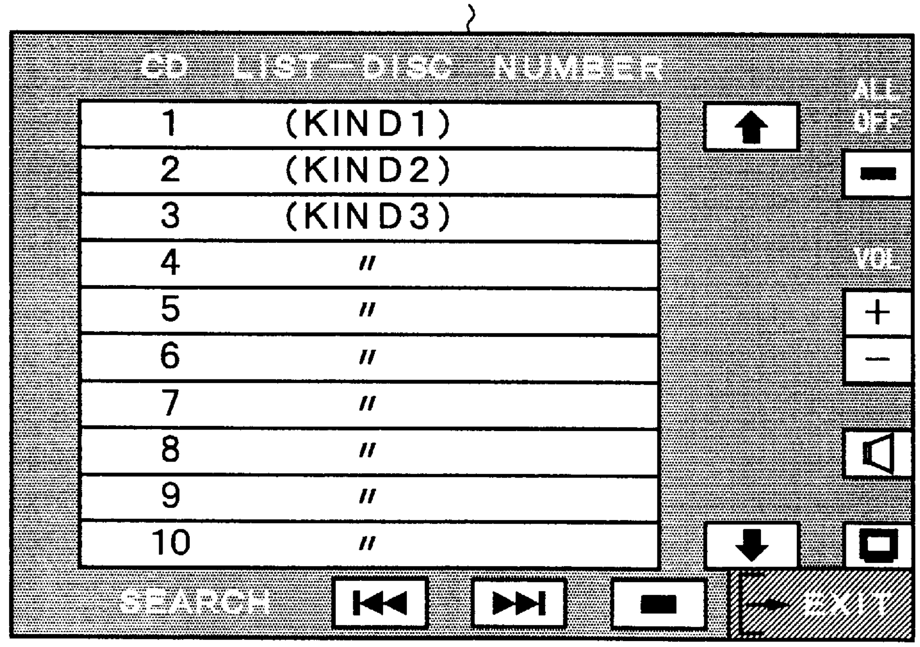
FIG. 10 is a schematic diagram showing an example of a display picture plane on the monitor.

In the above description, although the CD changer 30 can output the video image, the invention is not limited to such an example. That is, the invention can be also applied to a case where the other A/V equipment which is connected to the A/V amplifier 20 doesn't have the video output. In this case, information of the equipment to be connected is previously recorded and when, for example, the forgoing "LIST" key is selected, the information of the corresponding equipment is read out from the memory 23. An image signal is formed on the basis of the read-out information and is displayed on the monitor 40. As shown in FIG. 10, the above display is performed to the center portion of the picture plane 50 shown in FIG. 7 mentioned above. The user can select the CD title by, for example, the remocon operation on the basis of the display of the picture plane 50.

In case of the above example, equipment which is connected to the A/V amplifier 20 cannot be specified. Therefore, in the memory 23, since it is difficult to assure enough area for each of the connected A/V equipment, information of a sufficient amount as compared with the case where the connecting equipment side has the video output means cannot be displayed.

As described above, according to the invention, in the A/V system such that a number of A/V equipment are connected, the control signal of the connected A/V equipment can be transferred to each equipment and, in association with the selection of the equipment, the control is shifted to the relevant equipment, there is an effect such that the user can perform the operation of each A/V equipment without changing and grasping a different remocon.

According to the invention, since the equipment can be controlled on the control picture plane which the connected equipment has, there are effects such that the maximum information of the equipment can be obtained and the operability is improved.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A control apparatus for controlling a plurality of electronic equipment units, comprising:

first memory means for storing first video data for displaying one graphical user interface corresponding to each of the plurality of electronic equipment units connected to the control apparatus;

pointer display data generating means for generating pointer display data;

input terminal means for inputting second video data for displaying a second graphical user interface which is supplied from a second memory means in a predetermined electronic equipment unit producing audio data with said second video data related to said audio data where said second video data provides more detailed information than said first video data;

selection means for selecting the first video data and the second video data; and synthesizing means for synthesizing the pointer display data and selected video data which is supplied from the selection means.

2. The control apparatus according to claim 1, wherein the second video data is selected to provide display information rather than the first video data.

3. The control apparatus according to claim 1, further comprising connecting means for connecting the plurality of electronic equipment units in series.

4. The control apparatus according to claim 1, further comprising control signal generating means for generating a control signal for controlling one electronic equipment unit by using another electronic equipment unit, wherein the control signal includes a control code signal and a data segment.

5. An electronic system comprising:

an electronic equipment unit producing first video data for displaying a first graphical user interface corresponding to each of a plurality of electronic equipment units included in the electronic system;

first memory means for storing the first video data;

second memory means for storing second video data for displaying a second graphical user interface where said second video data relates to audio data and provides more detailed information than said first video data about said audio data;

pointer display data generating means for generating pointer display data;

selection means for selecting one of the first video data and the second video data;

synthesizing means for synthesizing the pointer display data and selected video data supplied from the selection means; and display means for displaying synthesized pointer display data and selected video data which is supplied from the synthesizing means.

6. The control apparatus according to claim 5, further comprising connecting means for connecting a plurality of electronic equipment units in series.

7. The control apparatus according to claim 5, further comprising control signal generating means for generating a control signal for controlling one electronic equipment unit by using another electronic equipment unit, wherein the control signal includes a control code signal and a data segment.

8. The electronic system according to claim 5, wherein the selected video data represents an internal state of the electronic equipment unit.

9. The electronic system according to claim 5, wherein the selected video data represents an index of media accessible by the electronic equipment unit.

* * * * *